United States Patent
Zhou et al.

(10) Patent No.: US 12,286,362 B2
(45) Date of Patent: Apr. 29, 2025

(54) PURIFIED WATER SUPPLY PIPELINE SYSTEM

(71) Applicants: KEMFLO (NANJING) ENVIRONMENT TECHNOLOGY CO., LTD., Nanjing (CN); KEMFLO INTERNATIONAL CO., LTD., Pingtung (TW); Ching-Hsiung Lin, Pingtung (TW)

(72) Inventors: Evan Zhou, Nanjing (CN); Edison Fan, Jiangsu (CN)

(73) Assignees: Kemflo (Nanjing) Environmental Technology co., Ltd., Jiangsu (CN); KEMFLO INTERNATIONAL CO., LTD., Pingtung (TW); Ching-Hsiung Lin, Pingtung (TW)

( * ) Notice: Subject to any disclaimer, the term of this patent is extended or adjusted under 35 U.S.C. 154(b) by 398 days.

(21) Appl. No.: 17/813,746

(22) Filed: Jul. 20, 2022

(65) Prior Publication Data
US 2023/0382765 A1    Nov. 30, 2023

(30) Foreign Application Priority Data
May 26, 2022    (CN) .......................... 202221281178.4

(51) Int. Cl.
C02F 1/00    (2023.01)
(52) U.S. Cl.
CPC .............. *C02F 1/006* (2013.01); *C02F 1/003* (2013.01); *C02F 1/008* (2013.01); *C02F 2201/005* (2013.01); *C02F 2303/16* (2013.01)
(58) Field of Classification Search
CPC ...... C02F 1/00; C02F 1/32; C02F 1/72; C02F 1/34; C02F 1/36; C02F 1/006; C02F 1/003; C02F 1/008; C02F 1/441; C02F 1/001; C02F 1/44; C02F 9/00; C02F 2201/005; C02F 2303/16; C02F 2209/005; C02F 2307/06; B01D 61/14; B01D 61/02; B01D 63/00; B01D 65/02; B01D 65/08
USPC ......................................................... 210/143
See application file for complete search history.

(56) References Cited

FOREIGN PATENT DOCUMENTS

CN    214715718 U  *  11/2021
CN    218642529 U  *   3/2023

OTHER PUBLICATIONS

CN_214715718 translation (Year: 2020).*
CN_218642529_U translation (Year: 2020).*

* cited by examiner

*Primary Examiner* — Akash K Varma
(74) *Attorney, Agent, or Firm* — Rosenberg, Klein & Lee

(57) ABSTRACT

A purified water supply pipeline system is provided. Source water flows from a source water inlet to a front filtration module, an inlet solenoid valve, a booster pump, and a main filtration module and is separated into purified water and waste water. The purified water flows through a first one-way valve to a rear filtration module and then flows to a purified water pipeline, on which a water outlet faucet is mounted. The waste water flows to a waste water pipeline, on which a waste water throttling element and a waste water outlet are disposed. The purified water also reflows to the main filtration module through a switch solenoid valve and the booster pump, to form a reflow pipeline. The purified water supply pipeline system balances concentration difference on both sides of the main filtration module. Accordingly, quality of the purified water and user experience are improved.

2 Claims, 1 Drawing Sheet

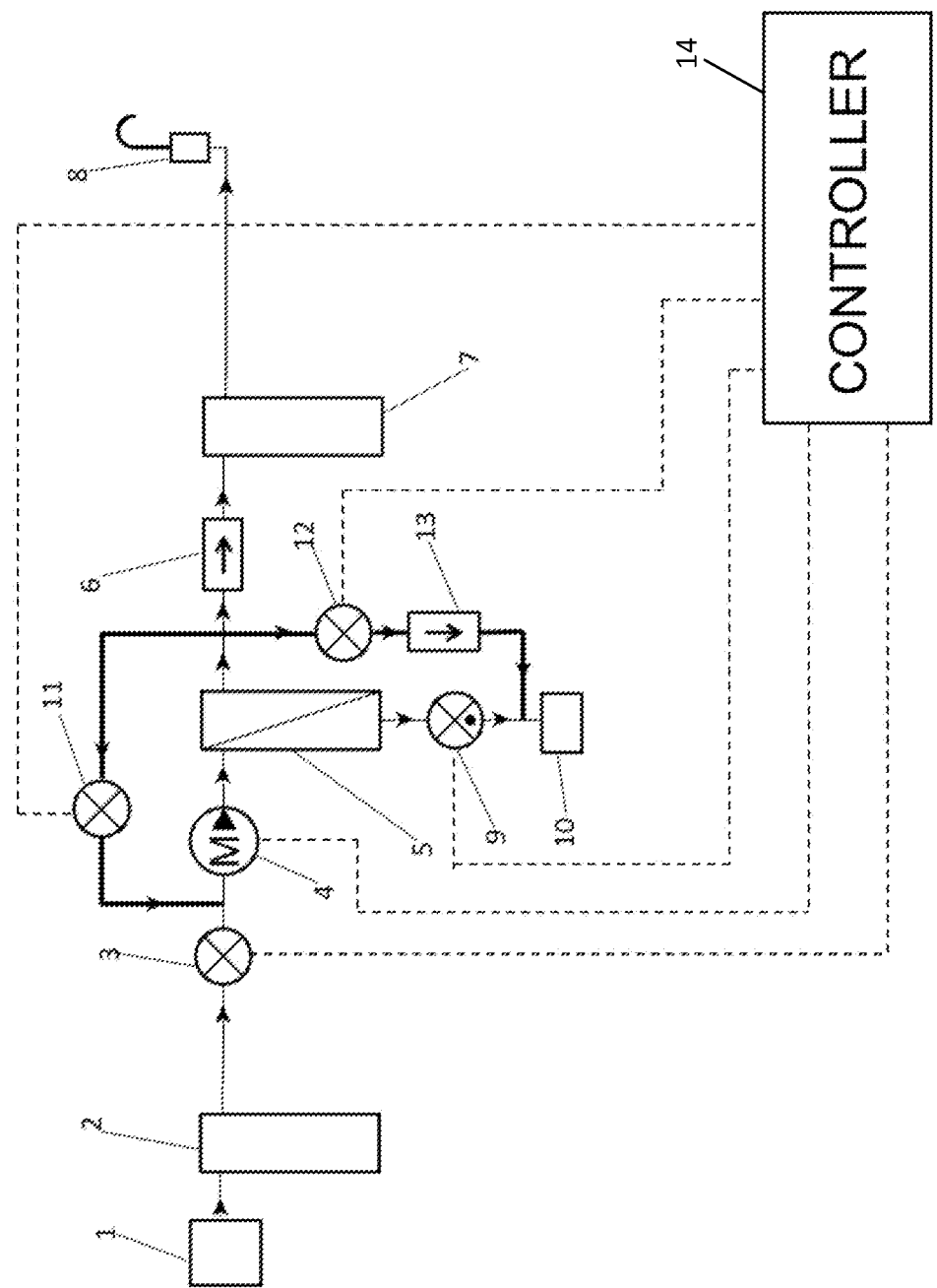

PURIFIED WATER SUPPLY PIPELINE SYSTEM

BACKGROUND OF THE INVENTION

1. Field of the Invention

The present invention relates to a pipeline system of a water purifier, especially to a purified water supply pipeline system of a water purifier.

2. Description of the Prior Art(s)

Water purifiers have been used in thousands of households. Purifying water efficiently is the goal pursued by every manufacturer and user. A reverse osmosis (RO) water purifier is a special kind of said water purifiers. To deal with the problem of high solute concentrations on two sides of an RO membrane has always been the focus of research and development by the manufacturers. Presently, although there are conventional pipeline systems, such as a timing flushing system, for flushing and draining, said conventional pipeline system can only prevent scale from forming on a surface of the RO membrane, but cannot prevent forward osmosis on the RO membrane. In addition, said conventional pipeline system has complicated structure and costs a lot to manufacture the pipeline system. Generally, the conventional pipeline system does not deal with the problem of high solute concentrations on the two sides of the RO membrane regularly according to the overall situation of the water purifier. Consequently, water purifying efficiency of the water purifier is unable to be always high.

To overcome the shortcomings, the present invention provides a purified water supply pipeline system to mitigate or obviate the aforementioned problems.

SUMMARY OF THE INVENTION

The main objective of the present invention is to provide a purified water supply pipeline system that includes a source water pipeline, a purified water pipeline, a waste water pipeline, and a reflow pipeline. Source water flows from a source water inlet to a front filtration module, passes the front filtration module and then flows to an inlet solenoid valve, a booster pump, and a main filtration module in sequence. The source water is separated into purified water and waste water after passing and filtered through the main filtration module. The purified water from the main filtration module flows through a first one-way valve to a rear filtration module. After passing through the rear filtration module, the purified water flows to the purified water pipeline. A water outlet faucet is mounted on the purified water pipeline. The waste water from the main filtration module flows to the waste water pipeline. A waste water throttling element and a waste water outlet are disposed on the waste water pipeline in sequence. The purified water from the main filtration module also reflows to the main filtration module by flowing through a switch solenoid valve and the booster pump in sequence, so as to form said reflow pipeline.

By substituting mixed water of the purified water and the source water for water of high solute concentrations in front of film stack of the main filtration module, concentration difference on both sides of the film stack can be balanced. Accordingly, quality of the purified water provided by the purified water supply pipeline system of the present invention, as well as user experience, is improved.

Other objectives, advantages and novel features of the invention will become more apparent from the following detailed description when taken in conjunction with the accompanying drawings.

BRIEF DESCRIPTION OF THE DRAWINGS

FIG. 1 is a schematic diagram of a purified water supply pipeline system in accordance with the present invention.

DETAILED DESCRIPTION OF THE PREFERRED EMBODIMENTS

With reference to FIG. 1, a purified water supply pipeline system in accordance with the present invention is shown and includes a source water pipeline, a purified water pipeline, a waste water pipeline, and a reflow pipeline. In the source water pipeline, source water flows from a source water inlet 1 to a front filtration module 2, passes the front filtration module 2 and then flows to an inlet solenoid valve 3, a booster pump 4, and a main filtration module 5 in sequence. The source water is separated into purified water and waste water after passing and filtered through the main filtration module 5. The purified water from the main filtration module 5 flows through a first one-way valve 6 to a rear filtration module 7. After passing through the rear filtration module 7, the purified water flows to the purified water pipeline. A water outlet faucet 8 is mounted on the purified water pipeline. The waste water from the main filtration module 5 flows to the waste water pipeline. A waste water throttling element 9 and a waste water outlet 10 are disposed on the waste water pipeline in sequence. The purified water from the main filtration module 5 also reflows to the main filtration module 5 by flowing through a switch solenoid valve 11 and the booster pump 4 in sequence, so as to form said reflow pipeline.

In the technique of the present invention, when the water outlet faucet 8 is turned off, by keeping the inlet solenoid valve 3 and the booster pump 4 being opened and switching on the switch solenoid valve 11 and the waste water throttling element 9, the purified water from the main filtration module 5 mixes with the source water after passing through the switch solenoid valve 11 and then washes a film surface of the main filtration module 5 under operation of the booster pump 4. After washing the film surface of the main filtration module 5, mixed water of the purified water and the source water flows through the waste water throttling element 9 and is discharged from the waste water outlet 10. Keep washing the main filtration module 5 for a few minutes before closing the inlet solenoid valve 3, the booster pump 4, the switch solenoid valve 11 and the waste water throttling element 9.

Through the technique of the present invention, it can ensure that when a water purifier stops providing the purified water, the mixed water of the purified water and the source water is able to be used to wash the film surface of the main filtration module 5 through the reflow pipeline and then discharged from the waste water outlet 10. That is, by substituting the mixed water of the purified water and the source water for water of high solute concentrations in front of film stack of the main filtration module 5, concentration difference on both sides of the film stack can be balanced, so as to ensure that there is no old water in the purified water supply pipeline system of the present invention. Accordingly, quality of the purified water provided by the purified water supply pipeline system of the present invention, as well as user experience, is improved. Moreover, the purified water supply pipeline system of the present invention has simplified structure, few structural parts, and low manufacturing cost.

Specifically, a drain solenoid valve 12 and a second one-way valve 13 may be provided. The purified water from the main filtration module 5 also flows through the drain solenoid valve 12 and the second one-way valve 13 to a waterway between the waste water throttling element 9 and the waste water outlet 10. When the water outlet faucet 8 has been turned off for hours and the water purifier does not operate, the water purifier can be started to work by opening the inlet solenoid valve 3, the booster pump 4 and the drain solenoid valve 12. In this way, the purified water from the main filtration module 5 flows through the drain solenoid valve 12 and the second one-way valve 13 to the waste water pipeline. When the water purifier has run for a few minutes, by closing the drain solenoid valve 12 and opening the waste water throttling element 9 simultaneously, the purified water is guided to wash the waste water pipeline. After washing the waste water pipeline for a few minutes, the inlet solenoid valve 3, the booster pump 4 and the waste water throttling element 9 are closed and the water purifier stops running.

Through the technique of the present invention, the purified water is guided to wash the waste water pipeline so as to further balance the concentration difference on both of the sides of the film stack. At the same time, water that permeates by forward osmosis due to the concentration difference is discharged. Thus, phenomenon that the water of high solute concentrations would permeate can be completely avoided, and quality of the purified water as well as user experience is improved.

Specifically, a controller 14 may be provided (not shown). The controller 14 is configured to control the inlet solenoid valve 3, the booster pump 4, the switch solenoid valve 11, the drain solenoid valve 12 and the waste water throttling element 9 to open or close, so as to improve the automatic operation of the water purifier. For instance, when the water outlet faucet 8 is turned off, through control of the controller 14, the switch solenoid valve 11 and the waste water throttling element 9 are opened, and the inlet solenoid valve 3 and the booster pump 4 are switched on.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A purified water supply pipeline system including a source water pipeline, a purified water pipeline, a waste water pipeline, a reflow pipeline, a drain solenoid valve, and a second one-way valve;

source water flowing from a source water inlet to a front filtration module, passing the front filtration module and then flowing to an inlet solenoid valve, a booster pump, and a main filtration module in sequence, wherein the source water is separated into purified water and waste water after passing and filtered through the main filtration module;

the purified water from the main filtration module flowing through a first one-way valve to a rear filtration module, wherein:

after passing through the rear filtration module, the purified water flows to the purified water pipeline; and a water outlet faucet is mounted on the purified water pipeline;

the waste water from the main filtration module flowing to the waste water pipeline, wherein a waste water throttling element and a waste water outlet are disposed on the waste water pipeline in sequence;

the purified water from the main filtration module also reflowing to the main filtration module by flowing through a switch solenoid valve and the booster pump in sequence, so as to form said reflow pipeline, wherein the purified water from the main filtration module also flows through the drain solenoid valve and the second one-way valve to a waterway between the waste water throttling element and the waste water outlet.

2. The purified water supply pipeline system as claimed in claim 1, further including a controller, wherein the controller is configured to control the inlet solenoid valve, the booster pump, the switch solenoid valve, the drain solenoid valve and the waste water throttling element to open or close.

* * * * *